(12) United States Patent
Deng et al.

(10) Patent No.: US 10,805,968 B2
(45) Date of Patent: Oct. 13, 2020

(54) BEARER SETUP METHOD, APPARATUS, AND SYSTEM

(71) Applicant: HUAWEI TECHNOLOGIES CO.,LTD., Shenzhen, Guangdong (CN)

(72) Inventors: Qiang Deng, Shenzhen (CN); Wanqiang Zhang, Beijing (CN); Zhenglei Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/030,318

(22) Filed: Jul. 9, 2018

(65) Prior Publication Data
US 2018/0324878 A1 Nov. 8, 2018

Related U.S. Application Data

(63) Continuation of application No. PCT/CN2016/070706, filed on Jan. 12, 2016.

(51) Int. Cl.
*H04W 76/11* (2018.01)
*H04W 76/12* (2018.01)

(52) U.S. Cl.
CPC .......... *H04W 76/11* (2018.02); *H04W 76/12* (2018.02)

(58) Field of Classification Search
CPC .................................................. H04W 76/11
See application file for complete search history.

(56) References Cited

U.S. PATENT DOCUMENTS

| 2012/0294236 | A1* | 11/2012 | Watfa | H04W 76/10 |
| | | | | 370/328 |
| 2014/0016614 | A1* | 1/2014 | Velev | H04W 4/70 |
| | | | | 370/331 |

(Continued)

FOREIGN PATENT DOCUMENTS

| CN | 101299882 A | 11/2008 |
| CN | 102158901 A | 8/2011 |

(Continued)

OTHER PUBLICATIONS

3GPP TS 23.401 V13.5.0 (Dec. 2015)3rd Generation Partnership Project;Technical Specification Group Services and System Aspects;General Packet Radio Service (GPRS) enhancements for Evolved Universal Terrestrial Radio Access Network (E-UTRAN) access(Release 13),total 337 pages.

(Continued)

*Primary Examiner* — John D Blanton
(74) *Attorney, Agent, or Firm* — Leydig, Voit & Mayer, Ltd.

(57) ABSTRACT

Embodiments of the present invention relate to the communications field and provide a bearer setup method, apparatus, and system. The method includes: receiving, by an MME, indication information, where the indication information is used to indicate a bearer type that is set up for UE; and setting up, by the MME, a bearer for the UE according to the indication information. By means of the method, indication information used to indicate a bearer type that is set up for UE is received, and different types of bearers are set up for the UE according to the indication information, so that an MME can adjust the bearer type in real time as required and set up different types of bearers for the UE, thereby efficiently transmitting sharply fluctuated data, and lowering (Continued)

loss of a network and the user equipment while improving user experience.

12 Claims, 10 Drawing Sheets

(56) References Cited

U.S. PATENT DOCUMENTS

| | | | | |
|---|---|---|---|---|
| 2014/0242970 A1* | 8/2014 | Yu | ............................ | H04W 8/02 |
| | | | | 455/419 |
| 2015/0373699 A1* | 12/2015 | Xu | ........................ | H04W 76/10 |
| | | | | 370/329 |
| 2016/0286376 A1 | 9/2016 | Yu et al. | | |

FOREIGN PATENT DOCUMENTS

| | | |
|---|---|---|
| CN | 103096291 A | 5/2013 |
| CN | 104010330 A | 8/2014 |
| CN | 104349388 A | 2/2015 |
| EP | 2509345 A1 | 10/2012 |
| EP | 2919519 A1 | 9/2015 |
| GB | 2514357 A | 11/2014 |

OTHER PUBLICATIONS

3GPP TS 24.301 V13.4.0 (Dec. 2015);3rd Generation Partnership Project;Technical Specification Group Core Network and Terminals;Non-Access-Stratum (NAS) protocol for Evolved Packet System (EPS); Stage 3(Release 13),total 400 pages.

3GPP TS 36.300 V13.2.0 (Dec. 2015);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 290 pages.

* cited by examiner

An MME receives indication information, where the indication information is used to indicate a bearer type that is set up for UE ⸺ 101

The MME sets up a bearer for the UE according to the indication information ⸺ 102

BEARER SETUP METHOD, APPARATUS, AND SYSTEM

CROSS-REFERENCE TO RELATED APPLICATIONS

This application is a continuation of International Application No. PCT/CN2016/070706, filed on Jan. 12, 2016, the disclosure of which is hereby incorporated by reference in its entirety.

TECHNICAL FIELD

The present invention relates to the field of mobile communications, and in particular, to a bearer setup method, apparatus, and system.

BACKGROUND

In a Long Term Evolution (LTE) network, to save radio resources and reduce power consumption of user equipment (UE), when the UE does not perform service interaction (that is, signaling or user plane data transmission) with the network within a period of time (for example, 30 seconds), the network releases a signaling connection and a user plane bearer between a side of an air interface and the UE. When the UE needs to send or receive user plane data, the UE first restores the signaling connection with the network, restores the user plane bearer by using the signaling connection, and then sends or receives the user plane data by using the restored user plane bearer.

Therefore, the user plane bearer in the LTE network is more proper for a case of frequent transmission of a large amount of data. For an infrequent small data service such as an M2M (Machine-to-Machine) service that has a small data volume, can tolerate a relatively low data transmission rate and is not sensitive to a delay, transmission is usually performed by using a control plane bearer. That is, transmission is performed by using a non-access stratum (NAS) message, so as to not only avoid frequent setup of user plane bearers and reduce signaling overheads, but also lower costs of an operator.

However, because a customer has different requirements at different periods of time, a data volume received or sent by UE also continuously changes. Using a power meter service as an example, normally, a power meter periodically uploads some small data; but at a particular period of time, the customer needs to upgrade software of the power meter and needs to transmit a large amount of data. How to properly set up a bearer for the UE to efficiently transmit sharply fluctuated data becomes an urgent problem to be resolved.

SUMMARY

Embodiments of the present invention provides a bearer setup method, apparatus, and system, to efficiently transmit sharply fluctuated data by dynamically setting up different types of bearers according to data states of UE.

According to a first aspect, a bearer setup method is provided, where the method includes: receiving, by a mobility management entity MME, indication information, where the indication information is used to indicate a bearer type that is set up for user equipment UE; and setting up, by the MME, a bearer for the UE according to the indication information.

With reference to the first aspect, in a first implementable manner of the first aspect, the receiving, by an MME, indication information includes: receiving the indication information sent by the UE; or receiving the indication information sent by a gateway device.

With reference to the first aspect or the first implementable manner of the first aspect, in a second implementable manner of the first aspect, the setting up, by the MME, a bearer for the UE according to the indication information includes:

if the bearer type is a user plane bearer, setting up, by the MME, a user plane bearer for the UE; or if the bearer type is a control plane bearer, setting up, by the MME, a control plane bearer for the UE.

With reference to the second implementable manner of the first aspect, in a third implementable manner of the first aspect, the setting up, by the MME, a user plane bearer for the UE includes:

sending, by the MME, an address of a base station of the UE and a tunnel endpoint identifier TEID of the base station to an SGW of the UE; and sending, by the MME, an address of the SGW and a TEID of the SGW to the base station.

With reference to the third implementable manner of the first aspect, in a fourth implementable manner of the first aspect, before the setting up, by the MME, a user plane bearer for the UE, the method further includes:

if a control plane transmission manner is used to transmit data between the MME and the SGW, sending, by the MME, a request message to the SGW, where the request message is used to request the address of the SGW and the TEID of the SGW; and receiving, by the MME, the address of the SGW and the TEID of the SGW that are sent by the SGW; or receiving, by the MME, the address of the SGW and the TEID of the SGW that are sent by the SGW.

With reference to the second implementable manner of the first aspect, in a fifth implementable manner of the first aspect, the setting up, by the MME, a control plane bearer for the UE includes:

setting up, by the MME, a user plane bearer between the MME and the SGW of the UE.

With reference to the fifth implementable manner of the first aspect, in a sixth implementable manner of the first aspect, the setting up, by the MME, a user plane bearer between the MME and the SGW includes:

sending, by the MME, an address of the MME and a TEID of the MME to the SGW; and receiving, by the MME, an address of the SGW and a TEID of the SGW.

With reference to the fifth or the sixth implementable manner of the first aspect, in a seventh implementable manner of the first aspect, the setting up, by the MME, the user plane bearer between the MME and the SGW further includes:

sending, by the MME, a paging message to the UE; and receiving a NAS response message sent by the UE and setting up a signaling radio bearer SRB.

With reference to any one of the third implementable manner or the fifth to the seventh implementable manners of the first aspect, in an eighth implementable manner of the first aspect, after the setting up, by the MME, a control plane bearer for the UE, the method further includes:

instructing, by the MME, the UE to transmit data in a control plane transmission manner.

It may be known from the foregoing technical solution that an MME receives indication information used to indicate a bearer type that is set up for UE, and sets up different types of bearers for the UE according to the indication information, so that the MME can adjust the bearer type in real time as required and set up different types of bearers for the UE, thereby efficiently transmitting sharply fluctuated data, and lowering loss of a network and the user equipment while improving user experience.

According to a second aspect, a bearer setup method is provided, where the method includes: monitoring, by a mobility management entity MME, a data transmission state of user equipment UE, where the data transmission state of the UE includes at least one of a data volume of the UE or a data packet sending frequency of the UE; and when the data transmission state of the UE satisfies a first preset condition, setting up, by the MME, a user plane bearer for the UE; or when the data transmission state of the UE satisfies a second preset condition, setting up, by the MME, a control plane bearer for the UE.

With reference to the second aspect, in a first implementable manner of the second aspect, if the data transmission state of the UE includes the data volume of the UE, the first preset condition is that the data volume of the UE is greater than a preset data volume threshold; or if the data transmission state of the UE includes the data packet sending frequency of the UE, the first preset condition is that the data packet sending frequency of the UE is greater than a preset frequency threshold; or if the data transmission state of the UE includes the data volume of the UE and the data packet sending frequency of the UE, the first preset condition is that the data packet sending frequency of the UE is greater than a preset frequency threshold, or the data volume of the UE is greater than a preset data volume threshold.

With reference to the second aspect or the first implementable manner of the second aspect, in a second implementable manner of the second aspect, the setting up, by the MME, a user plane bearer for the UE includes:

sending, by the MME, an address of a base station of the UE and a tunnel endpoint identifier TEID of the base station to an SGW of the UE; and sending, by the MME, an address of the SGW and a TEID of the SGW to the base station.

With reference to any one of the second aspect or the implementable manners of the second aspect, in a third implementable manner of the second aspect, after the setting up, by the MME, a user plane bearer for the UE, the method further includes:

releasing, by the MME, the user plane bearer between the MME and the SGW of the UE.

With reference to any one of the second aspect or the implementable manners of the second aspect, in a fourth implementable manner of the second aspect, after the setting up, by the MME, a user plane bearer for the UE, the method further includes:

sending, by the MME, transmission manner indication information to a packet data network gateway PGW, where the transmission manner indication information is used to indicate that a data transmission manner of the UE is a user plane transmission manner.

With reference to the second aspect, in a fifth implementable manner of the second aspect, if the data transmission state includes the data volume of the UE, the second preset condition is that the data volume of the UE is less than a preset data volume threshold; or if the data transmission state includes the data packet sending frequency of the UE, the second preset condition is that the data packet sending frequency of the UE is less than a preset frequency threshold; or if the data transmission state of the UE includes the data volume of the UE and the data packet sending frequency of the UE, the second preset condition is that the data packet sending frequency of the UE is less than a preset frequency threshold, and the data volume of the UE is less than a preset data volume threshold.

With reference to the fifth implementable manner of the second aspect, in a sixth implementable manner of the second aspect, the setting up, by the MME, a control plane bearer for the UE includes:

setting up, by the MME, the user plane bearer between the MME and the SGW of the UE.

With reference to the sixth implementable manner of the second aspect, in a seventh implementable manner of the second aspect, the setting up, by the MME, the user plane bearer between the MME and the SGW of the UE includes:

sending, by the MME, an address of the MME and a TEID of the MME to the SGW; and receiving, by the MME, an address of the SGW and a TEID of the SGW.

It may be known from the foregoing technical solution that an MME monitors a data transmission state of UE and determines to set up a user plane bearer or a control plane bearer according to the data transmission state of the UE, that is, adjusts a bearer type in real time according to the data transmission state of the UE, so as to adapt to fluctuation of data volume of the UE, and lower loss of a network and the user equipment while improving user experience.

According to a third aspect, a bearer setup method is provided, where the method includes: monitoring, by communication equipment, a status of to-be-sent data of user equipment UE; and sending, by the communication equipment, indication information to a mobility management entity MME according to the status of the to-be-sent data, where the indication information is used to indicate a bearer type that is set up for the UE.

With reference to the third aspect, in a first implementable manner of the third aspect, if the to-be-sent data is big data, the bearer type is a user plane bearer; or if the to-be-sent data is infrequent small data, the bearer type is a control plane bearer.

With reference to the first implementable manner of the third aspect, in a second implementable manner of the third aspect, the monitoring, by communication equipment, a status of to-be-sent data of user equipment UE includes:

if a length of the to-be-sent data is greater than a preset length threshold, the to-be-sent data is big data; or if a length of the to-be-sent data is less than a preset length threshold, and a sending or receiving frequency of the to-be-sent data is less than a preset frequency threshold, the to-be-sent data is infrequent small data.

With reference to any one of the third aspect or the implementable manners of the third aspect, in a third implementable manner of the third aspect, the communication equipment is a gateway device, and the to-be-sent data of the UE is data to be sent by the gateway device to the UE; or the communication equipment is the UE, and the to-be-sent data of the UE is data to be sent by the UE.

It may be known from the foregoing technical solution that a status of to-be-sent data of UE is monitored and indication information used to indicate a bearer type is sent to an MME according to the status of the to-be-sent data of the UE, so that the MME sets up different types of bearers in real time according to the indication information, so as to adapt to transmission of sharply fluctuated data services.

According to a fourth aspect, a bearer setup apparatus is provided, where the apparatus is a mobility management entity MME and the apparatus includes:

a receiving unit, configured to receive indication information, where the indication information is used to indicate a bearer type that is set up for user equipment UE; and a bearer setup unit, configured to set up a bearer for the UE according to the indication information received by the receiving unit.

With reference to the fourth aspect, in a first implementable manner of the fourth aspect, the receiving unit is specifically configured to: receive the indication information sent by the UE; or receive the indication information sent by a gateway device.

With reference to the first implementable manner of the fourth aspect, in a second implementable manner of the fourth aspect, the bearer setup unit is specifically configured to: if the bearer type is a user plane bearer, set up a user plane bearer for the UE; or if the bearer type is a control plane bearer, set up a control plane bearer for the UE.

With reference to the second implementable manner of the fourth aspect, in a third implementable manner of the fourth aspect, the bearer setup unit is specifically further configured to:

send an address of a base station of the UE and a tunnel endpoint identifier TEID of the base station to the SGW of the UE; and send an address of the SGW and a TEID of the SGW to the base station.

With reference to the third implementable manner of the fourth aspect, in a fourth implementable manner of the fourth aspect, the bearer setup unit is further configured to: if a control plane transmission manner is used to transmit data between the MME and the SGW, send a request message to the SGW, where the request message is used to request the address of the SGW and the TEID of the SGW; and the receiving unit is further configured to receive the address of the SGW and the TEID of the SGW that are sent by the SGW; or the receiving unit is further configured to receive the address of the SGW and the TEID of the SGW that are sent by the SGW.

With reference to the second implementable manner of the fourth aspect, in a fifth implementable manner of the fourth aspect, the bearer setup unit is specifically configured to:

set up the user plane bearer between the MME and the SGW of the UE.

With reference to the fifth implementable manner of the fourth aspect, in a sixth implementable manner of the fourth aspect, the bearer setup unit is specifically further configured to:

send an address of the MME and a TEID of the MME to the SGW; and receive an address of the SGW and a TEID of the SGW.

With reference to the fourth or the fifth implementable manner of the fourth aspect, in a sixth implementable manner of the fourth aspect, the bearer setup unit is specifically further configured to: send a paging message to the UE; and receive a NAS response message sent by the UE and set up a signaling radio bearer SRB.

The apparatus receives indication information used to indicate a bearer type that is set up for UE, and sets up different types of bearers for the UE according to the indication information, so that the apparatus can adjust the bearer type in real time as required and set up different types of bearers for the UE, thereby efficiently transmitting sharply fluctuated data, and lowering loss of a network and the user equipment while improving user experience.

According to a fifth aspect, a bearer setup apparatus is provided, where the apparatus is a mobility management entity MME and the apparatus includes:

a monitoring unit, configured to monitor a data transmission state of user equipment UE, where the data transmission state of the UE includes at least one of a data volume of the UE or a data packet sending frequency of the UE; and a bearer setup unit, configured to: when the data transmission state of the UE satisfies a first preset condition, set up a user plane bearer for the UE; or when the data transmission state of the UE satisfies a second preset condition, set up a control plane bearer for the UE.

With reference to the fifth aspect, in a first implementable manner of the fifth aspect, if the data transmission state of the UE includes the data volume of the UE, the first preset condition is that the data volume of the UE is greater than a preset data volume threshold; or if the data transmission state of the UE includes the data packet sending frequency of the UE, the first preset condition is that the data packet sending frequency of the UE is greater than a preset frequency threshold; or if the data transmission state of the UE includes the data volume of the UE and the data packet sending frequency of the UE, the first preset condition is that the data packet sending frequency of the UE is greater than a preset frequency threshold, or the data volume of the UE is greater than a preset data volume threshold.

With reference to the fifth aspect or the first implementable manner of the fifth aspect, in a second implementable manner of the fifth aspect, the bearer setup unit is specifically configured to: send an address of a base station of the UE and a tunnel endpoint identifier TEID of the base station to an SGW of the UE; and send an address of the SGW and a TEID of the SGW to the base station.

With reference to any one of the fifth aspect or the implementable manners of the fifth aspect, in a third implementable manner of the fifth aspect, the apparatus further includes a first releasing unit, where the first releasing unit is configured to release the user plane bearer between the MME and the SGW of the UE.

With reference to any one of the fifth aspect or the implementable manners of the fifth aspect, in a fourth implementable manner of the fifth aspect, the apparatus further includes a first sending unit, where the first sending unit is configured to send transmission manner indication information to a packet data network gateway PGW, where the transmission manner indication information is used to indicate that a data transmission manner of the UE is a user plane transmission manner.

With reference to the fifth aspect, in a fifth implementable manner of the fifth aspect, if the data transmission state includes the data volume of the UE, the second preset condition is that the data volume of the UE is less than a preset data volume threshold; or if the data transmission state includes the data packet sending frequency of the UE, the second preset condition is that the data packet sending frequency of the UE is less than a preset frequency threshold; or if the data transmission state of the UE includes the data volume of the UE and the data packet sending frequency of the UE, the second preset condition is that the data packet sending frequency of the UE is less than a preset frequency threshold, and the data volume of the UE is less than a preset data volume threshold.

With reference to the fifth implementable manner of the fifth aspect, in a sixth implementable manner of the fifth aspect, the bearer setup unit is specifically configured to:

set up the user plane bearer between the MME and the SGW of the UE.

With reference to the sixth implementable manner of the fifth aspect, in a seventh implementable manner of the fifth aspect, the bearer setup unit is specifically further configured to:

send an address of the MME and a TEID of the MME to the SGW; and receive an address of the SGW and a TEID of the SGW.

With reference to any one of the fifth aspect or the fifth to the seventh implementable manners of the fifth aspect, in an eighth implementable manner of the fifth aspect, the bearer setup unit is specifically further configured to:

instruct the UE to transmit data in a control plane transmission manner.

According to a sixth aspect, a bearer setup apparatus is provided, where the apparatus includes:

a monitoring unit, configured to monitor a status of to-be-sent data of user equipment UE; and a sending unit, configured to send indication information to a mobility management entity MME according to the status of the to-be-sent data, where the indication information is used to indicate a bearer type that is set up for the UE.

The apparatus monitors a data transmission state of UE and sets up a user plane bearer or a control plane bearer for the UE according to the data transmission state of the UE, that is, adjusts a bearer type in real time according to the data transmission state of the UE, so as to adapt to fluctuation of data volume of the UE, and lower loss of a network and the user equipment while improving user experience.

With reference to the sixth aspect, in a first implementable manner of the sixth aspect, if the to-be-sent data is big data, the bearer type is a user plane bearer; or if the to-be-sent data is infrequent small data, the bearer type is a control plane bearer.

With reference to the first implementable manner of the sixth aspect, in a second implementable manner of the sixth aspect, the monitoring unit is specifically configured to:

if a length of the to-be-sent data is greater than a preset length threshold, the to-be-sent data is big data; or if a length of the to-be-sent data is less than a preset length threshold, and a sending or receiving frequency of the to-be-sent data is less than a preset frequency threshold, the to-be-sent data is infrequent small data.

With reference to any one of the sixth aspect or the implementable manners of the sixth aspect, in a third implementable manner of the sixth aspect, the apparatus is a gateway device, and the to-be-sent data of the UE is data to be sent by the gateway device to the UE; or the apparatus is the UE, and the to-be-sent data of the UE is data to be sent by the UE.

The apparatus monitors a status of to-be-sent data of UE and sends indication information used to indicate a bearer type, to an MME according to the status of the to-be-sent data of the UE, so that the MME sets up different types of bearers in real time according to the indication information, so as to adapt to transmission of sharply fluctuated data services.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figures 1A, 1B:
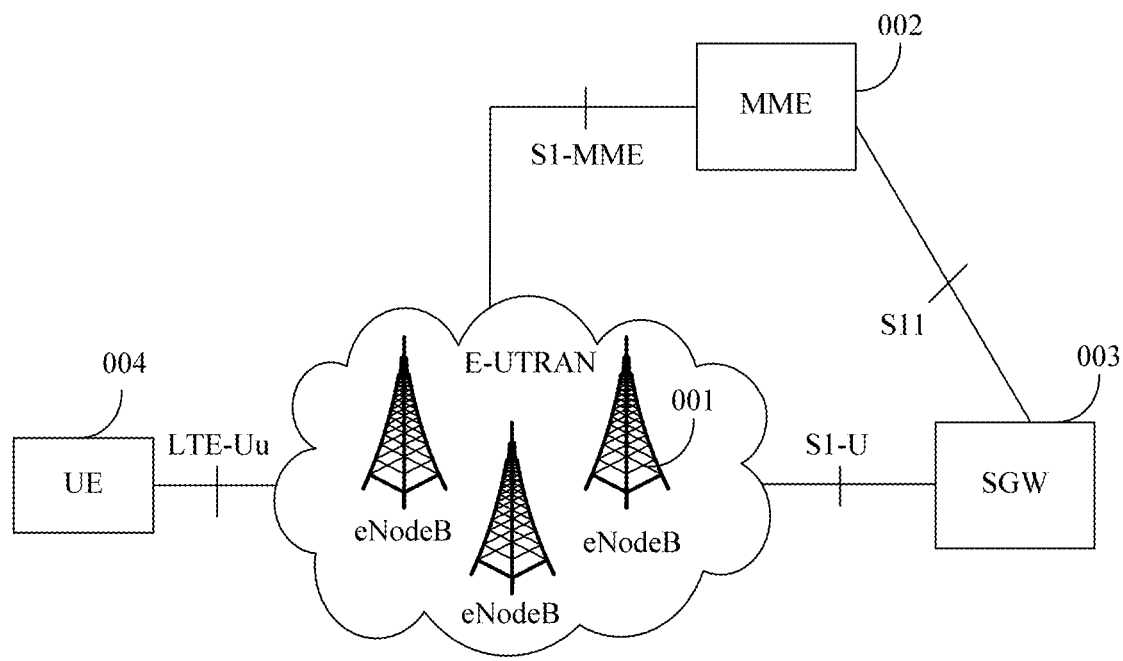
FIG. 1a is a schematic structural diagram of an LTE system.
FIG. 1b is a flowchart of a bearer setup method according to an embodiment of the present invention.

FIG. 1a is a schematic structural diagram of an LTE system. The LTE system is formed by an evolved UMTS terrestrial radio access network (E-UTRAN) and an evolved packet core (EPC). The E-UTRAN is a network formed by multiple eNodeBs 001. The EPC includes a mobility management entity (MME) 002 responsible for signaling processing and a serving gateway (SGW) 003 responsible for data processing. The eNodeBs 001 in the E-UTRAN are connected to the SGW 003 in the EPC by using a user plane interface, are connected to the MME 002 in the EPC by using a control plane interface, and are connected to UE 004 by using an LTE-Uu interface, and the MME 002 in the EPC is connected to the SGW 003 by using an S11 interface. The user plane interface is also referred to as S1-U, and the control plane interface is also referred to as S1-MME.

It should be noted that in each embodiment of the present invention, a user plane bearer may specifically include a data radio bearer (DRB) of the LTE-Uu interface, and an S1 user plane bearer of the S1-U. A control plane bearer may be specifically a NAS message between the UE and the MME, and the NAS message may be transmitted by using a signaling radio bearer (SRB) of the LTE-Uu interface and an S1 control plane signaling bearer of the S1-MME interface.

Further, a difference between the user plane bearer and the control plane bearer may be described below by using a transmission approach of uplink data sent by the UE as an example.

When the UE 004 transmits sent data by using the control plane bearer, the UE 004 sends the NAS message carrying the data, to the MME 002 by using the SRB of the LTE-Uu interface and the S1 control plane signaling bearer of the S1-MME interface. The MME 002 sends the received data to the SGW 003 by using an S11 user plane bearer of the S11 interface. This manner of transmitting to-be-sent data of the UE by using the control plane bearer may be referred to as a control plane transmission manner.

When the UE 004 transmits data by using the user plane bearer, the UE 004 sends the data to an eNodeB 001 by using the DRB of the LTE-Uu interface, and the eNodeB 001 sends the received data to the SGW 003 by using the S1 user plane bearer of the S1-U interface. This manner of transmitting to-be-sent data of the UE by using the user plane bearer may be referred to as a user plane transmission manner.

The foregoing description is not used to limit the present invention, but is used to describe examples in which the two different bearers are used to transmit data on different paths.

As shown in FIG. 1b, an embodiment of the present invention provides a bearer setup method which is applicable to UE in an idle state or a connected state, and details are as follows.

Step 101: An MME receives indication information, where the indication information is used to indicate a bearer type that is set up for UE.

The bearer type may specifically include a user plane bearer or a control plane bearer. The user plane bearer may specifically include a DRB (a bearer between the UE and a base station), and an S1 user plane bearer (a bearer between the base station and an SGW). The control plane bearer may specifically be a NAS message between the UE and the MME, and the NAS message may be transmitted by using an SRB (a bearer between the UE and the base station) and an S1 control plane signaling bearer (a bearer between the base station and the MME). Refer to the related description shown in FIG. 1a that belongs to the prior art, and details are not described.

It should be noted that the bearer type indicated by the indication information may specifically use an explicit manner or an implicit manner, and examples are described as follows.

When an explicit manner is used, a set value indicating a bit may be used to explicitly indicate that the bearer type is the user plane bearer or the control plane bearer. For example, when a set value indicating a bit is 1, it indicates that the bearer type is the user plane bearer, or when a set value indicating a bit is 0, it indicates that the bearer type is the control plane bearer.

When an implicit manner is used, it is assumed that the indication information is used to indicate status of to-be-sent data of the UE. For example, when a set value of the indication information is 1, it indicates that a data volume of to-be-sent data of the UE is greater than a preset data volume threshold, that is, the to-be-sent data is big data. In this case, to be capable of providing better service quality to the UE, the MME sets up a user plane bearer for the UE to transmit the to-be-sent data of the UE. When a set value of the indication information is 0, it indicates that a data volume of to-be-sent data of the UE is less than a preset data volume threshold, and a sending frequency of the to-be-sent data of the UE is less than a preset frequency threshold, that is, the to-be-sent data is infrequent small data. In this case, to avoid a waste of a large quantity of signaling resources and a quantity of electricity of the UE, the MME sets up a control plane bearer for the UE to transmit the to-be-sent data of the UE.

The indication information may be carried in a NAS message and sent to the MME.

Optionally, step 101 may specifically use the following two implementations:

Manner 1: Receive the indication information sent by the UE.

The indication information may specifically be carried in a service request message.

Manner 2: Receive the indication information sent by a gateway device.

The gateway device may be an SGW or a packet data network gateway (PGW) of the UE. This is not limited in the present invention.

Further, when the gateway device is the SGW of the UE, the indication information may be carried in a GPRS tunneling protocol (GTP) message such as a downlink data notification (DDN) message.

Step 102: The MME sets up a bearer for the UE according to the indication information.

Specifically, step 102 may include at least one of the following step 102a or step 102b.

102a: If the bearer type indicated by the indication information is a user plane bearer, the MME sets up a user plane bearer for the UE.

Step 102a of setting up, by the MME, a user plane bearer for the UE may specifically include:

sending, by the MME, an address of a base station of the UE and a tunnel endpoint identifier (TEID) of the base station to the SGW; and sending, by the MME, an address and a TEID of the SGW to the base station of the UE.

The base station of the UE may specifically be a base station that provides services for the UE, and the SGW may specifically be a serving gateway that provides services for the UE.

102b: If the bearer type indicated by the indication information is a control plane bearer, the MME sets up a control plane bearer for the UE.

Step 102b of setting up, by the MME, a control plane bearer for the UE may specifically include:

sending, by the MME, an address and a TEID of the MME to the SGW of the UE; and receiving, by the MME, an address and a TEID of the SGW of the UE.

Further, when the UE is in an idle state, step 102b of setting up, by the MME, a control plane bearer for the UE further includes:

sending, by the MME, a paging message to the UE; and
receiving a NAS response message sent by the UE and setting up an SRB.

According to the bearer setup method provided in this embodiment of the present invention, indication information used to indicate a bearer type that is set up for UE is received, and different types of bearers are set up for the UE according to the indication information, so that an MME can adjust the bearer type in real time as required and set up different types of bearers for the UE, thereby efficiently transmitting sharply fluctuated data, and lowering loss of a network and the user equipment while improving user experience.

Optionally, in a first implementation scenario of the foregoing embodiment, before step 102a of setting up, by the MME, a user plane bearer for the UE, the method further includes:

if a control plane transmission manner is used to transmit data between the MME and the SGW of the UE, sending, by the MME, a request message to the SGW of the UE, where the request message is used to request the address and the TEID of the SGW; and receiving, by the MME, the address and the TEID of the SGW that are sent by the SGW; or receiving, by the MME, the address and the TEID of the SGW that are sent by the SGW.

The address and the TEID of the SGW may specifically be carried in a GTP message such as a DDN message, and sent to the MME.

It should be noted that when an implementation of the manner 2 is used in step 101, the gateway device may add the indication information and the address and the TEID of the SGW to a same GTP message and send the GTP message to the MME. This is not limited herein.

Optionally, in a second implementation scenario of the foregoing embodiment, after step 102a, the method further includes:

releasing, by the MME, the user plane bearer between the MME and the SGW of the UE.

Specifically, because the SGW sends downlink data of the UE to the base station by using an S1 user plane bearer and then sends the downlink data of the UE to the UE, and an S11 user plane bearer between the MME and the SGW is no longer configured to send downlink data of the UE, the MME may release the S11 user plane bearer to save resources.

Optionally, in a third implementation scenario of the foregoing embodiment, after step 102b of setting up, by the MME, a control plane bearer for the UE, the method further includes:

instructing, by the MME, the UE to transmit data in a control plane transmission manner.

Specifically, the MME may instruct, by using a paging message or a tracking area update (TAU) accept message, the UE to transmit data in a control plane transmission manner. This is not limited herein.

The instructing the UE to transmit data in a control plane transmission manner can avoid retransmission of uplink data of the UE and improve user experience.

Optionally, in a fourth implementation scenario of the foregoing embodiment, after step 102b of setting up, by the MME, a control plane bearer for the UE, the method further includes: triggering, by the MME, releasing of a data radio bearer and an S1 user plane bearer.

The releasing of the data radio bearer and the S1 user plane bearer can avoid a waste of resources and improve running efficiency of a radio network system.

Optionally, in a fifth implementation scenario of the foregoing embodiment, after step 102, the method further includes:

Step 103: The MME sends transmission manner indication information to a PGW, where the transmission manner indication information is used to indicate that a data transmission manner of the UE is the control plane transmission manner or a user plane transmission manner.

By means of step 103, the transmission manner indication information is sent to the PGW, so that the PGW uses different charging methods for different transmission manners.

Figure 2:
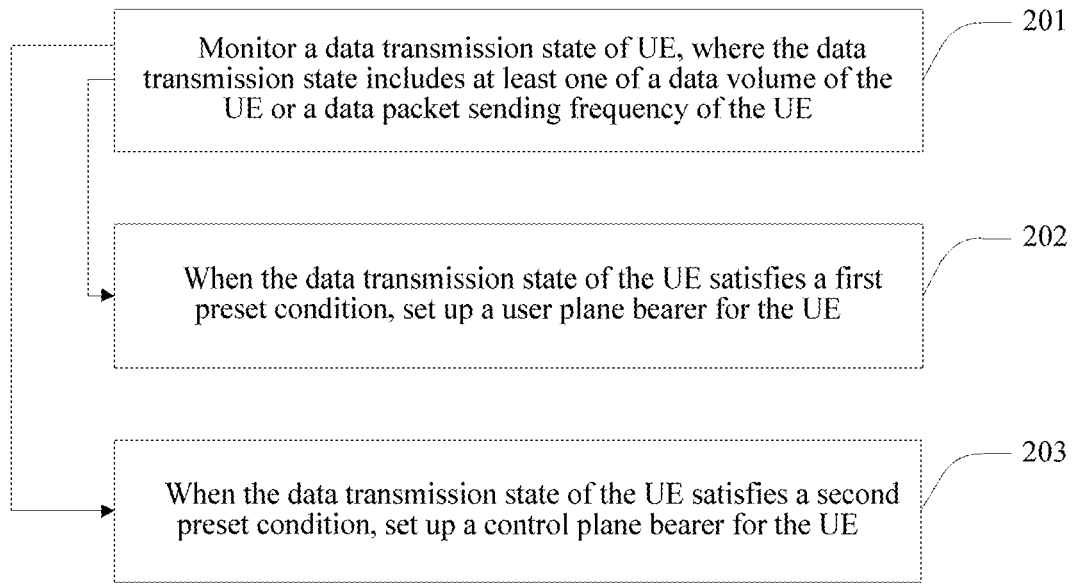
FIG. 2 is a flowchart of another bearer setup method according to an embodiment of the present invention.

As shown in FIG. 2, an embodiment of the present invention provides a bearer setup method. The method is performed by an MME, and details are as follows.

Step 201: Monitor a data transmission state of UE, where the data transmission state of the UE includes at least one of a data volume of the UE or a data packet sending frequency of the UE.

The data volume of the UE may be a total volume of uplink data of the UE or a total volume of downlink data of the UE within a period of time, or may be a sum of a total volume of uplink data and a total volume of downlink data of the UE within a period of time. The data packet sending frequency of the UE may be an uplink data packet sending frequency of the UE or a downlink data packet sending frequency of the UE, or obviously may be an uplink/downlink data packet sending frequency of the UE. This is not limited in the present invention. In addition, the data packet sending frequency of the UE may be replaced with a data packet sending interval, that is, a time interval for sending two data packets. Because meanings of a frequency and an interval belong to the prior art, details are not described.

After step 201, step 202 or 203 may be performed. This is not limited.

Step 202: When the data transmission state of the UE satisfies a first preset condition, set up a user plane bearer for the UE.

The first preset condition may be preset inside the MME, or may be configured for the MME by using an external interface. In addition, quality, frequency, data volume size, data packet sending interval, or the like may be considered in a data transmission process for the first preset condition. For details, an example may be described as follows:

if the data transmission state of the UE includes the data volume of the UE, the first preset condition is that the data volume of the UE is greater than a preset data volume threshold; or if the data transmission state of the UE includes the data packet sending frequency of the UE, the first preset condition is that the data packet sending frequency of the UE is greater than a preset frequency threshold; or if the data transmission state of the UE includes the data volume of the UE and the data packet sending frequency of the UE, the first preset condition is that the data packet sending frequency of the UE is greater than a preset frequency threshold, or the data volume of the UE is greater than a preset data volume threshold.

Step 203: When the data transmission state of the UE satisfies a second preset condition, set up a control plane bearer for the UE.

The second preset condition may be preset inside the MME, or may be configured for the MME by using an external interface. In addition, quality, frequency, data volume size, data packet sending interval, or the like may be considered in a data transmission process for the second preset condition. For details, an example may be described as follows:

if the data transmission state of the UE includes the data volume of the UE, the second preset condition is that the data volume of the UE is less than a preset data volume threshold; or if the data transmission state of the UE includes the data packet sending frequency of the UE, the second preset condition is that the data packet sending frequency of the UE is less than a preset frequency threshold; or if the data transmission state of the UE includes the data volume of the UE and the data packet sending frequency of the UE, the second preset condition is that the data packet sending frequency of the UE is less than a preset frequency threshold, and the data volume of the UE is less than a preset data volume threshold.

It should be noted that for detailed description of the user plane bearer and the control plane bearer in step 202 and step 203, refer to the embodiment shown in FIG. 1b, and details are not described.

According to the bearer setup method provided in this embodiment of the present invention, an MME monitors a data transmission state of UE and determines to set up a user plane bearer or a control plane bearer according to the data transmission state of the UE, that is, adjusts a bearer type in real time according to the data transmission state of the UE, so as to adapt to fluctuation of data volume of the UE, and lower loss of a network and the user equipment while improving user experience.

Optionally, in a first implementation scenario of the foregoing embodiment, step 202 of setting up, by the MME, a user plane bearer for the UE includes:

sending, by the MME, an address of a base station of the UE and a TEID of the base station to the SGW of the UE; and sending, by the MME, an address and a TEID of the SGW of the UE to the base station.

For the base station of the UE, refer to related description in the embodiment shown in FIG. 1b, and details are not described.

Optionally, in a second implementation scenario of the foregoing embodiment, after step 202, the method further includes:

releasing, by the MME, the user plane bearer between the MME and the SGW of the UE.

Specifically, because the SGW sends downlink data of the UE to the base station by using an S1 user plane bearer and then sends the downlink data of the UE to the UE, and an S11 user plane bearer between the MME and the SGW is no longer configured to send downlink data of the UE, the MME may release the S11 user plane bearer to save resources.

Optionally, in a third implementation scenario of the foregoing embodiment, after step 202, the method further includes:

sending, by the MME, transmission manner indication information to a PGW, where the transmission manner indication information is used to indicate that a data transmission manner of the UE is a user plane transmission manner.

The transmission manner indication information is sent to the PGW, so that the PGW uses different charging methods for different transmission manners.

Optionally, in a fourth implementation scenario of the foregoing embodiment, step 203 of setting up, by the MME, a control plane bearer for the UE may specifically include:

setting up, by the MME, the user plane bearer between the MME and the SGW of the UE.

Further, optionally, the setting up, by the MME, the user plane bearer between the MME and the SGW of the UE includes:

sending, by the MME, an address of the MME and a TEID of the MME to the SGW; and receiving, by the MME, an address of the SGW and a TEID of the SGW.

Optionally, in a fifth implementation scenario of the foregoing embodiment, after step 203, the method further includes:

instructing, by the MME, the UE to transmit data in a control plane transmission manner.

The instructing the UE to transmit data in a control plane transmission manner can avoid retransmission of uplink data of the UE and improve user experience.

Optionally, in a sixth implementation scenario of the foregoing embodiment, after the setting up, by the MME, a control plane bearer for the UE, that is, after step 203, the method further includes:

triggering, by the MME, releasing of a data radio bearer and an S1 user plane bearer.

The releasing of the data radio bearer and the S1 user plane bearer can avoid a waste of resources and improve running efficiency of a radio network system.

Figure 3:
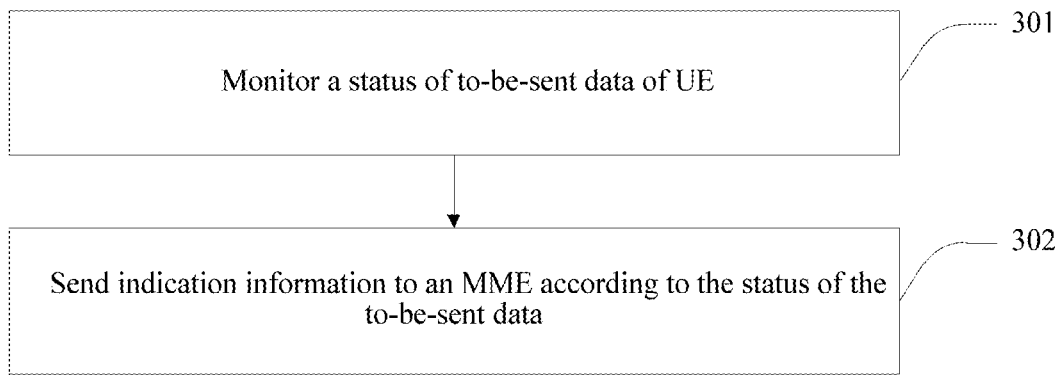
FIG. 3 is a flowchart of another bearer setup method according to an embodiment of the present invention.

As shown in FIG. 3, an embodiment of the present invention provides a bearer setup method. The method is performed by communication equipment, which may specifically be UE, or may be a gateway device such as an SGW or a PGW. Details are as follows.

Step 301: Monitor a status of to-be-sent data of UE.

When the communication equipment is a gateway device, the to-be-sent data of the UE may be data to be sent by the gateway device to the UE; or when the communication equipment is the UE, the to-be-sent data of the UE is data to be sent by the UE to a network.

The status of the to-be-sent data may specifically be a length of the to-be-sent data or a volume of the to-be-sent data. This is not limited.

Step 302: Send indication information to an MME according to the status of the to-be-sent data.

The indication information is used to indicate a bearer type that is set up for the UE.

Specifically, if the to-be-sent data is big data, the bearer type may be a user plane bearer; or if the to-be-sent data is infrequent small data, the bearer type may be a control plane bearer.

According to the bearer setup method provided in this embodiment of the present invention, a status of to-be-sent data of UE is monitored and indication information used to indicate a bearer type is sent to an MME according to the status of the to-be-sent data of the UE, so that the MME sets up different types of bearers in real time according to the indication information, so as to adapt to transmission of sharply fluctuated data services.

Optionally, in a first implementation scenario of the foregoing embodiment, step 301 specifically includes:

if a length of the to-be-sent data is greater than a preset length threshold, the to-be-sent data is big data; or if a length of the to-be-sent data is less than a preset length threshold, and a sending or receiving frequency of the to-be-sent data is less than a preset frequency threshold, the to-be-sent data is infrequent small data.

Using infrequent small data as an example for description. When the communication equipment is a gateway device, if a length of downlink data of the UE received by the gateway device is less than the preset length threshold, and a receiving frequency of the downlink data is less than the preset frequency threshold, the to-be-sent data is infrequent small data. When the communication equipment is UE, if a length of data to be sent by the UE to a network side is less than the preset length threshold, and a sending frequency of the UE is less than the preset frequency threshold, the to-be-sent data is infrequent small data.

It should be noted that when the communication equipment is a PGW, in step 302, specifically, the PGW may first send the indication information to an SGW, and then the SGW sends the indication information to the MME.

Optionally, in a second implementation scenario of the foregoing embodiment, step 301 specifically includes:

if a data volume of the to-be-sent data is greater than a preset data volume threshold, the to-be-sent data is big data; or if a data volume of the to-be-sent data is less than a preset data volume threshold, and a sending or receiving frequency of the to-be-sent data is less than a preset frequency threshold, the to-be-sent data is infrequent small data.

Figure 4:
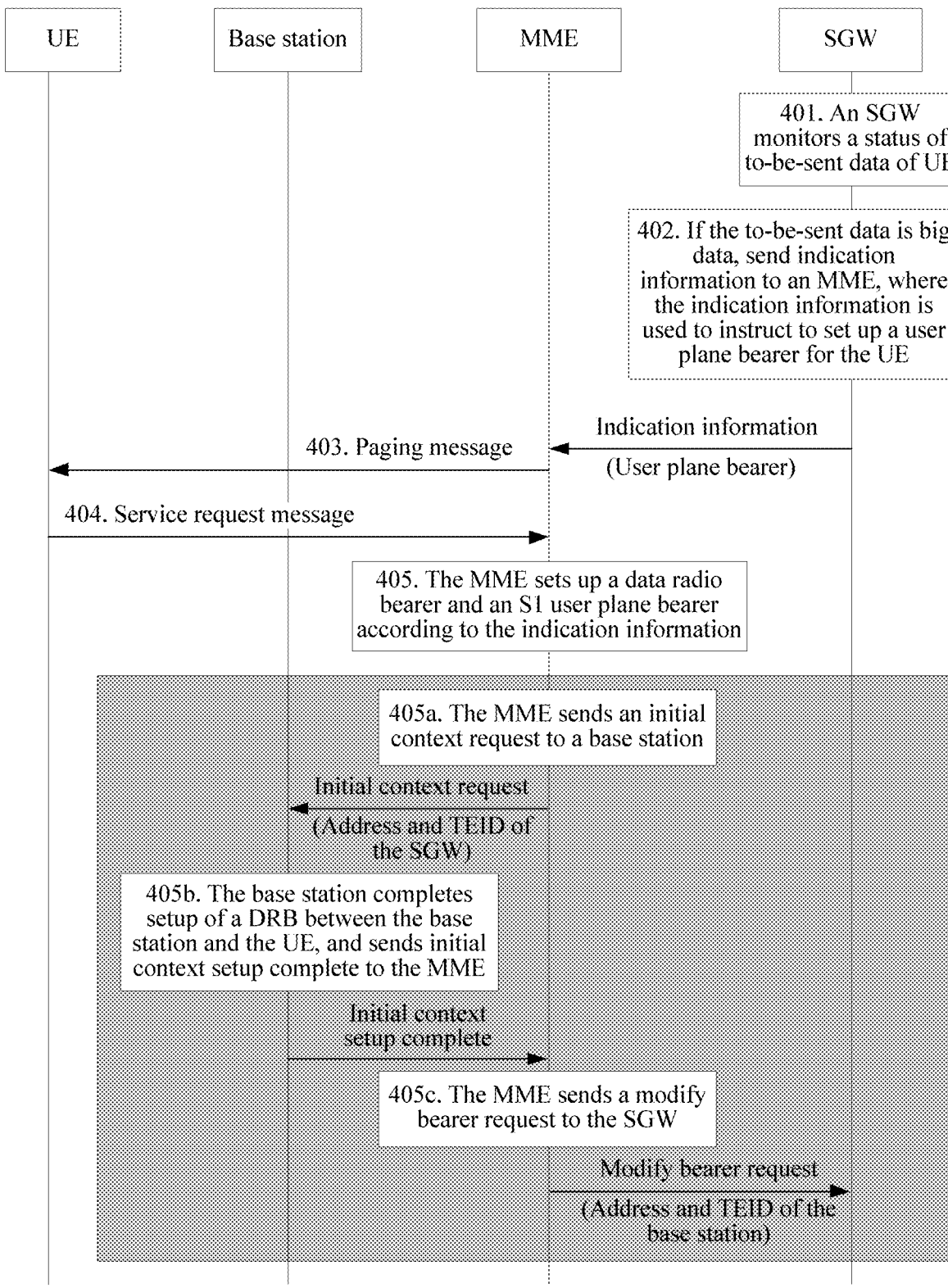
FIG. 4 is a flowchart of another bearer setup method according to an embodiment of the present invention.

As shown in FIG. 4, an embodiment of the present invention provides a bearer setup method. An example in which UE is in an idle state and receives downlink data is used for description, and details are as follows.

Step 401: An SGW monitors a status of to-be-sent data of UE.

For the to-be-sent data of the UE, refer to related description of the embodiment shown in FIG. 3. For example, the to-be-sent data of the UE may be downlink data of the UE received by the SGW.

Step 402: If the to-be-sent data is big data, send indication information to an MME, where the indication information is used to instruct to set up a user plane bearer for the UE.

For related description of big data, refer to the embodiment shown in FIG. 3, and details are not described.

Step 403: The MME sends a paging message to the UE.

Step 404: The UE sends a service request to the MME.

Step 405: The MME sets up a data radio bearer and an S1 user plane bearer according to the indication information.

Step 405 may specifically include the following step 405*a* to step 405*c*.

Step 405*a*: The MME sends an initial context request to a base station, where the initial context request carries an address and a TEID of the SGW.

Step 405*b*: After completing setup of a DRB between the base station and the UE, the base station sends initial context setup complete to the MME.

Step 405*c*: The MME sends a modify bearer request to the SGW, where the modify bearer request carries an address and a TEID of the base station.

Optionally, the modify bearer request may carry transmission manner indication information, where the transmission manner indication information is used to indicate that a data transmission manner of the UE is a user plane transmission manner, so that the SGW sends the transmission indication information to a PGW, thereby facilitating charging of the PGW.

Figure 5:
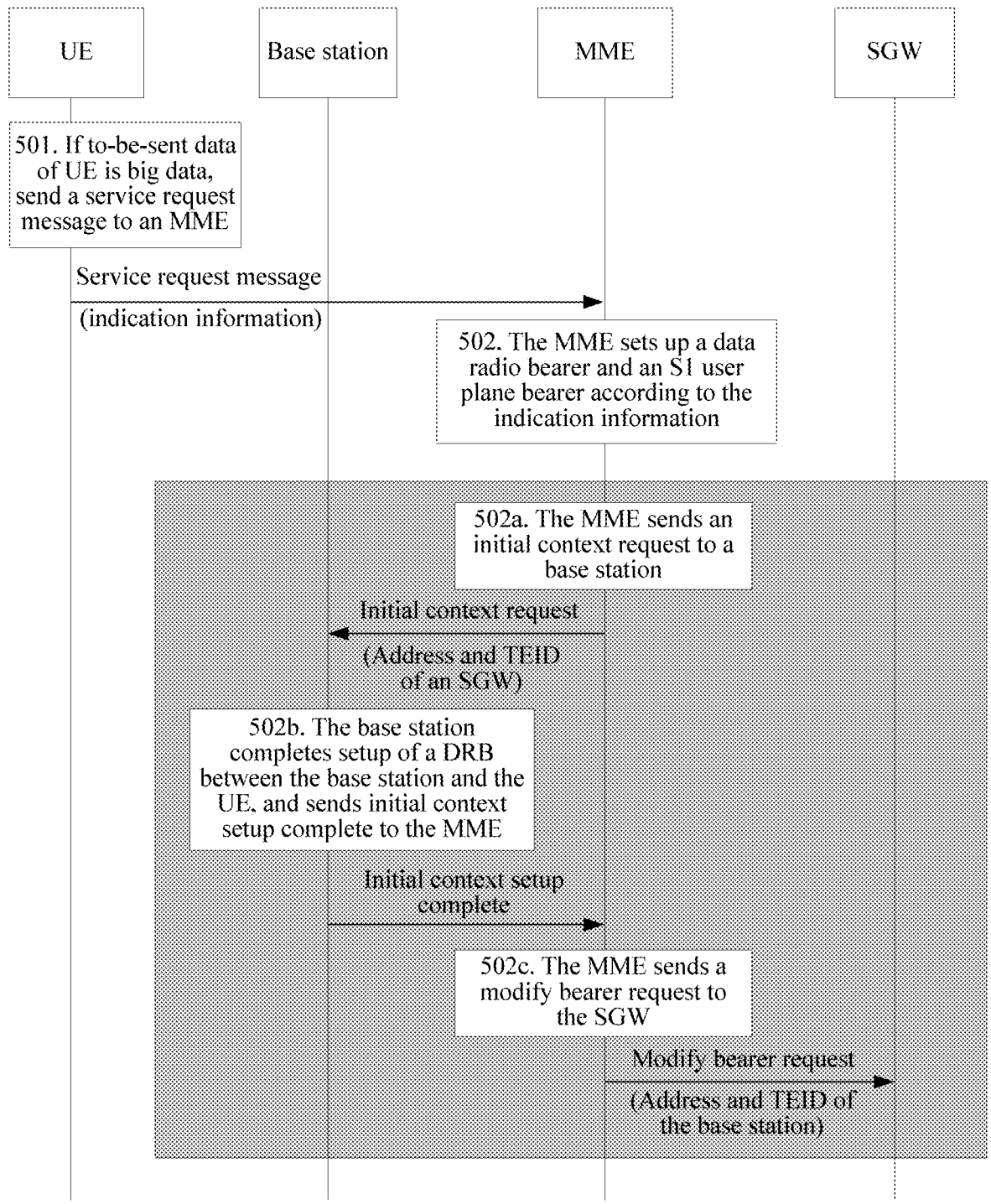
FIG. 5 is a flowchart of another bearer setup method according to an embodiment of the present invention.

As shown in FIG. 5, an embodiment of the present invention provides a bearer setup method. An example in which UE is in an idle state and sends uplink data is used for description, and details are as follows.

Step 501: If to-be-sent data of UE is big data, the UE sends a service request message to an MME, where the service request message carries indication information used to instruct to set up a user plane bearer for the UE.

For related description of the to-be-sent data of the UE and big data, refer to the embodiment shown in FIG. 3, and details are not described.

Step 502: The MME sets up a data radio bearer and an S1 user plane bearer according to the indication information.

Step 502 may specifically include the following steps.

Step 502*a*: The MME sends an initial context setup request to a base station, where the initial context setup request carries an address and a TEID of an SGW.

Step 502*b*: After completing setup of the DRB between the base station and the UE, the base station sends initial context setup complete to the MME.

Step 502*c*: The MME sends a modify bearer request to the SGW, where the modify bearer request carries an address and a TEID of the base station.

Optionally, the modify bearer request may carry transmission manner indication information, where the transmission manner indication information is used to indicate that a data transmission manner of the UE is a user plane transmission manner, so that the SGW sends the transmission indication information to a PGW, thereby facilitating charging of the PGW.

Optionally, before step 502*a*, the method further includes:

if a control plane transmission manner is used to transmit data between the MME and the SGW, requesting, by the MME from the SGW, the address and the TEID of the SGW; and receiving, by the MME, the address and the TEID that are sent by the SGW.

Figure 6:
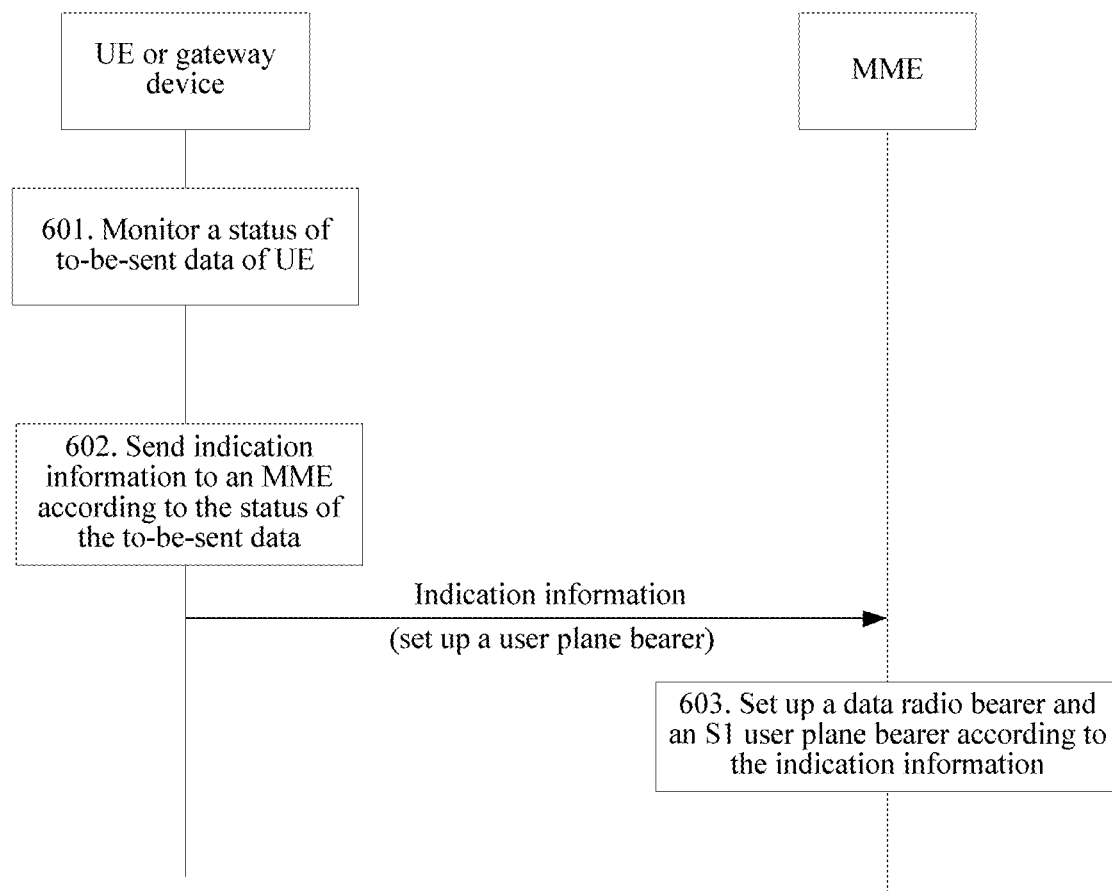
FIG. 6 is a flowchart of another bearer setup method according to an embodiment of the present invention.

As shown in FIG. 6, an embodiment of the present invention provides a bearer setup method. An example in which UE is in a connected state and transmits data by using a control plane bearer is used for description, and details are as follows.

Step 601: UE or a gateway device monitors a status of to-be-sent data of the UE.

Step 602: The UE or the gateway device sends indication information to an MME according to the status of the to-be-sent data, where the indication information is used to instruct to set up a user plane bearer for the UE.

For related description of step 601 and step 602, refer to the embodiment shown in FIG. 3, and details are not described.

For the to-be-sent data of the UE in step 601, refer to related description of the embodiment shown in FIG. 3. For example, the to-be-sent data of the UE may be downlink data of the UE received by the gateway device, or may be uplink data to be sent by the UE.

Step 603: The MME sets up a data radio bearer and an S1 user plane bearer according to the indication information.

Step 603 may also include 502*a* to 502*c* in the embodiment shown in FIG. 5, and details are not described.

Figure 7:
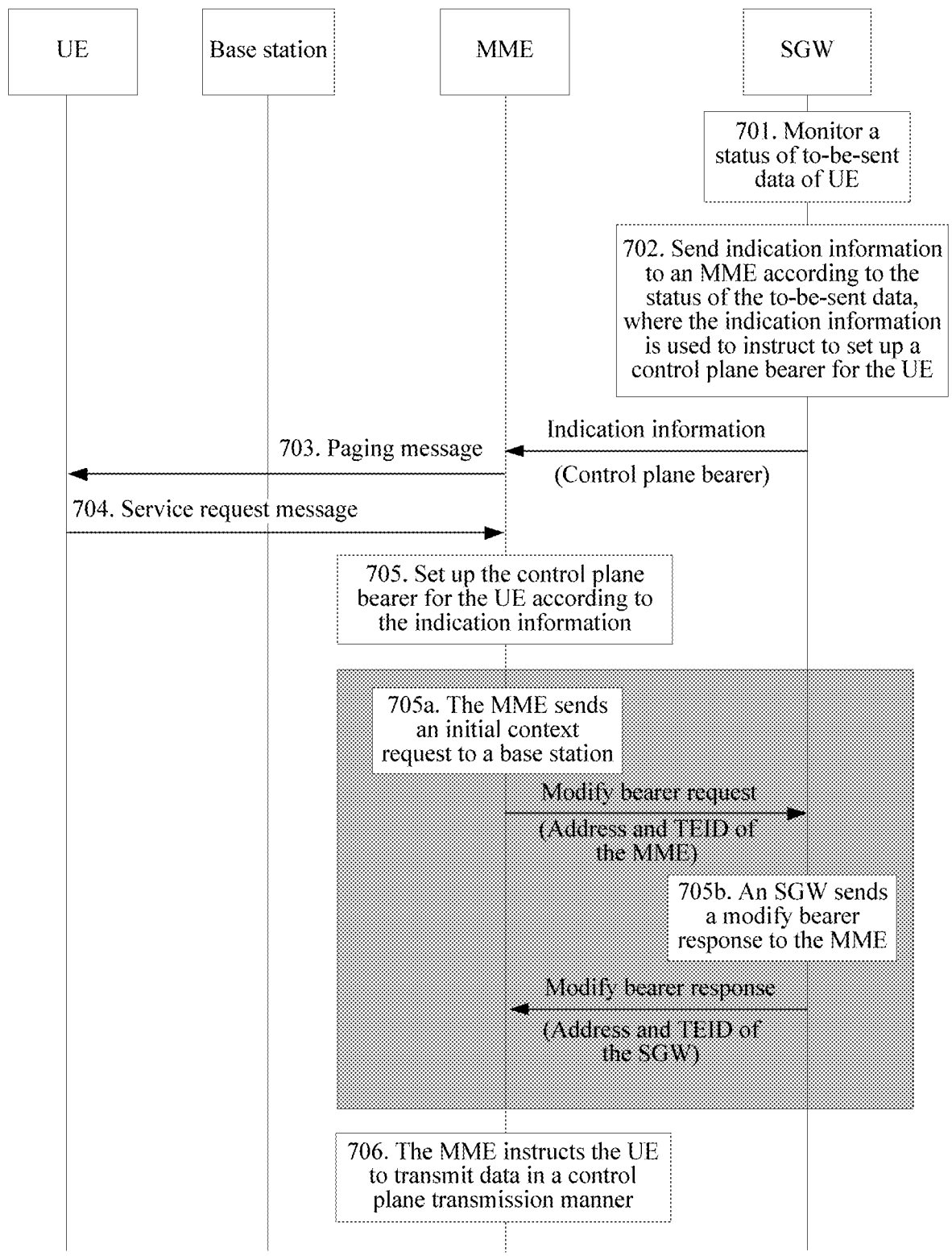
FIG. 7 is a flowchart of another bearer setup method according to an embodiment of the present invention.

As shown in FIG. 7, an embodiment of the present invention provides a bearer setup method. An example in which UE is in an idle state is used for description, and details are as follows.

Step 701: An SGW monitors a status of to-be-sent data of UE.

Step 702: The SGW sends indication information to an MME according to the status of the to-be-sent data, where the indication information is used to instruct to set up a control plane bearer for the UE.

The indication information may be carried in a DDN message and sent to the MME.

For related description of step 701 and step 702, refer to the embodiment shown in FIG. 3, and details are not described.

Step 703: The MME sends a paging message to the UE.

Step 704: The UE sends a service request to the MME.

Step 705: The MME sets up the control plane bearer for the UE according to the indication information.

Step 705 may specifically include the following steps.

Step 705a: The MME sends a modify bearer request to the SGW, where the modify bearer request carries an address and a TEID of the MME.

Step 705b: The SGW sends a modify bearer response to the MME, where the modify bearer response carries an address and a TEID of the SGW.

Step 706: The MME instructs the UE to transmit data in a control plane transmission manner.

Specifically, the MME may instruct the UE by using a TAU accept message, or may instruct the UE by using the paging message in step 703. This is not limited.

Optionally, the modify bearer request carries transmission manner indication information, where the transmission manner indication information is used to indicate that a data transmission manner of the UE is the control plane transmission manner, so that the SGW sends the transmission indication information to a PGW, thereby facilitating charging of the PGW.

Figure 8:
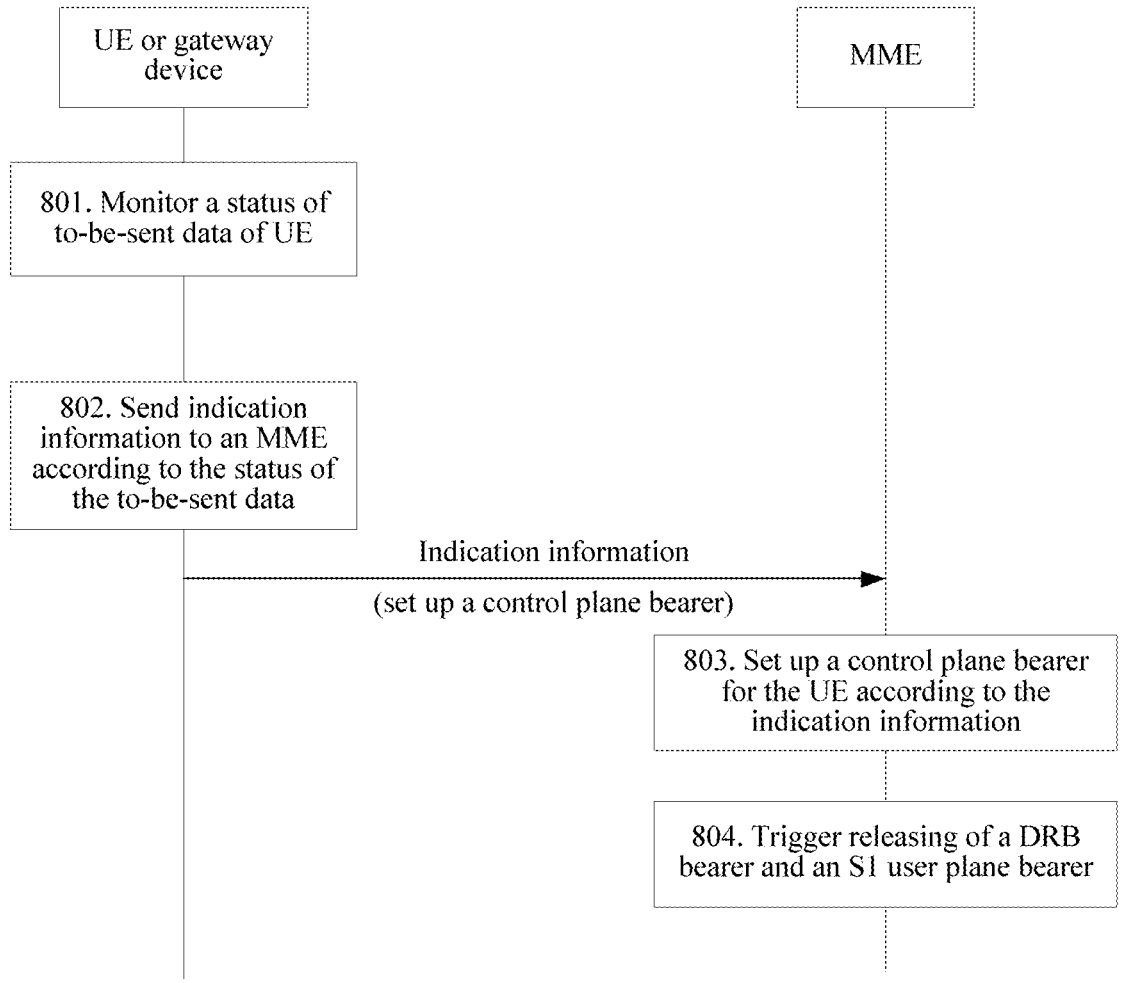
FIG. 8 is a flowchart of another bearer setup method according to an embodiment of the present invention.

As shown in FIG. 8, an embodiment of the present invention provides a bearer setup method. An example in which UE is in a connected state and transmits data by using a user plane bearer is used for description, and details are as follows.

Step 801: UE or a gateway device monitors a status of to-be-sent data of the UE.

Step 802: The UE or the gateway device sends indication information to an MME according to the status of the to-be-sent data, where the indication information is used to instruct to set up a control plane bearer for the UE.

For related description of step 801 and step 802, refer to the embodiment shown in FIG. 3, and details are not described.

For example, the to-be-sent data of the UE in step 801 may be downlink data of the UE received by the gateway device, or may be uplink data to be sent by the UE.

Step 803: The MME sets up the control plane bearer for the UE according to the indication information.

Step 803 may also include 705a and 705b in the embodiment shown in FIG. 7, and details are not described.

Step 804: The MME triggers releasing of a DRB bearer and an S1 user plane bearer.

Figure 9:
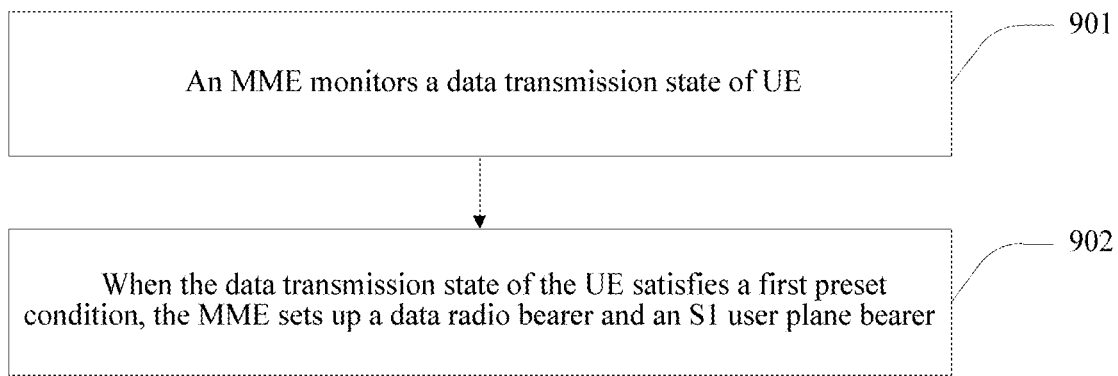
FIG. 9 is a flowchart of another bearer setup method according to an embodiment of the present invention.

As shown in FIG. 9, an embodiment of the present invention provides a bearer setup method. An example in which UE is in a connected state and transmits data by using a control plane bearer is used for description, and details are as follows.

Step 901: An MME monitors a data transmission state of UE.

Step 902: When the data transmission state of the UE satisfies a first preset condition, the MME sets up a data radio bearer and an S1 user plane bearer.

For the data transmission state and the first preset condition, refer to related description of the embodiment shown in FIG. 2, and details are not described.

Step 901 may specifically include step 502a to step 502c in the embodiment shown in FIG. 5, and details are not described.

Figure 10:
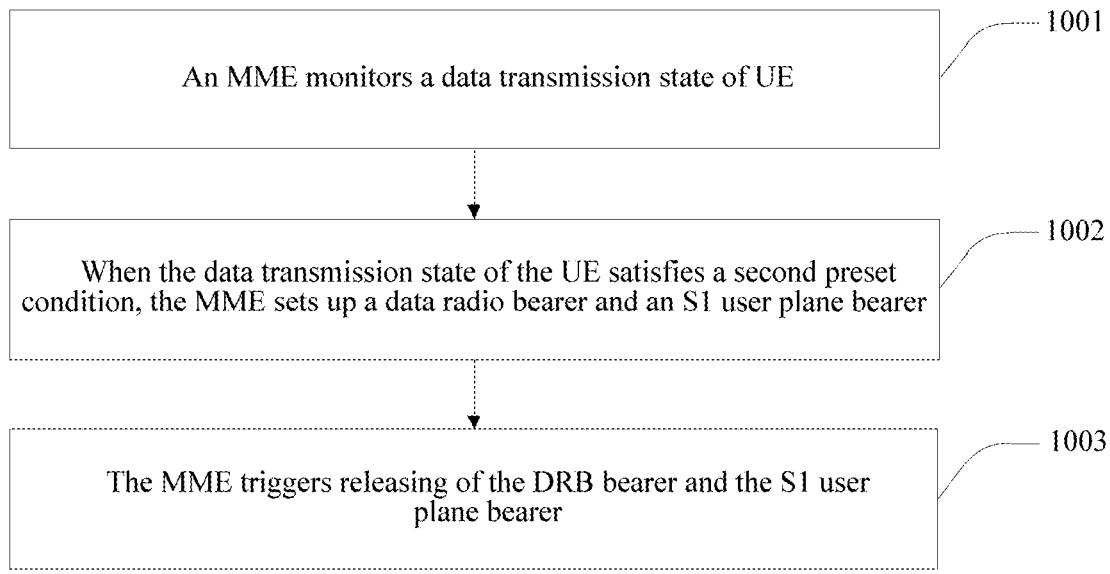
FIG. 10 is a flowchart of still another bearer setup method according to an embodiment of the present invention.

As shown in FIG. 10, an embodiment of the present invention provides a bearer setup method. An example in which UE is in a connected state and transmits data by using a user plane bearer is used for description, and details are as follows.

Step 1001: An MME monitors a data transmission state of UE.

Step 1002: When the data transmission state of the UE satisfies a second preset condition, the MME sets up a control plane bearer for the UE.

For the data transmission state and the second preset condition, refer to related description of the embodiment shown in FIG. 2, and details are not described.

Step 1002 in which the MME sets up a control plane bearer for the UE may also include 705a and 705b in the embodiment shown in FIG. 7, and details are not described.

Step 1003: The MME triggers releasing of a DRB bearer and an S1 user plane bearer.

It should be noted that a sequence of the steps to be performed in each method embodiment described above is not strictly limited and may be adaptively adjusted according to actual application situations and rules in a standard.

Figure 11:
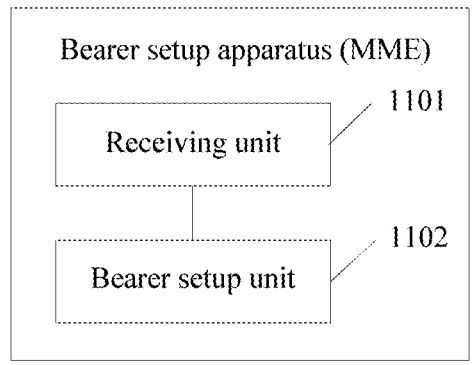
FIG. 11 is a schematic diagram of a bearer setup apparatus according to an embodiment of the present invention.

As shown in FIG. 11, an embodiment of the present invention provides a bearer setup apparatus. The apparatus may be an MME, and may specifically be configured to perform the steps of the MME in the embodiment shown in any one of FIG. 1b or FIG. 4 to FIG. 8. The apparatus includes a receiving unit 1101 and a bearer setup unit 1102 as follows.

The receiving unit 1101 is configured to receive indication information, where the indication information is used to indicate a bearer type that is set up for UE.

The bearer setup unit 1102 is configured to set up a bearer for the UE according to the indication information received by the receiving unit 1101.

For the indication information, the bearer, the bearer type and the setup of the bearer for the UE, refer to related description in the embodiment shown in FIG. 1b, and details are not described.

Optionally, the receiving unit 1101 is specifically configured to:

receive the indication information sent by the UE; or receive the indication information sent by a gateway device.

The gateway device may specifically be a PGW or an SGW. This is not limited.

The indication information may be carried in a NAS message. Specifically, when the gateway device is a serving gateway SGW of the UE, the indication information may be carried in a GTP message.

Optionally, the bearer setup unit 1102 is specifically configured to:

if the bearer type is a user plane bearer, set up a user plane bearer for the UE; or if the bearer type is a control plane bearer, set up a control plane bearer for the UE.

For the user plane bearer and the control plane bearer, refer to related description of each method embodiment described above, and details are not described.

Optionally, the bearer setup unit 1102 is specifically further configured to:

send an address of a base station of the UE and a TEID of the base station to the SGW of the UE; and send an address of the SGW and a TEID of the SGW to the base station.

For details of the base station and the SGW, refer to related description of each method embodiment described above, and details are not described.

Optionally, the bearer setup unit 1102 is further configured to: if a control plane transmission manner is used to transmit data between the MME and the SGW, send a request message to the SGW, where the request message is used to request the address of the SGW and the TEID of the SGW.

The receiving unit 1101 is further configured to receive the address of the SGW and the TEID of the SGW that are sent by the SGW.

Optionally, the receiving unit 1101 is further configured to receive the address of the SGW and the TEID of the SGW that are sent by the SGW.

Optionally, the bearer setup unit 1102 is specifically configured to:

set up the user plane bearer between the MME and the SGW of the UE.

Optionally, the bearer setup unit 1102 is specifically further configured to:

send an address of the MME and a TEID of the MME to the SGW; and receive an address of the SGW and a TEID of the SGW.

Optionally, the bearer setup unit 1102 is specifically further configured to:

send a paging message to the UE; and receive a NAS response message sent by the UE and set up a signaling radio bearer SRB.

Optionally, the bearer setup unit 1102 is further configured to:

instruct the UE to transmit data in a control plane transmission manner.

Optionally, the apparatus further includes a sending unit 1103, configured to send transmission manner indication information to a packet data network gateway PGW, where the transmission manner indication information is used to indicate that a data transmission manner of the UE is the control plane transmission manner or a user plane transmission manner.

The bearer setup apparatus provided in this embodiment of the present invention receives indication information used to indicate a bearer type that is set up for UE, and sets up different types of bearers for the UE according to the indication information, so that the apparatus can adjust the bearer type in real time as required and set up different types of bearers for the UE, thereby efficiently transmitting sharply fluctuated data, and lowering loss of a network and the user equipment while improving user experience.

Figure 12:
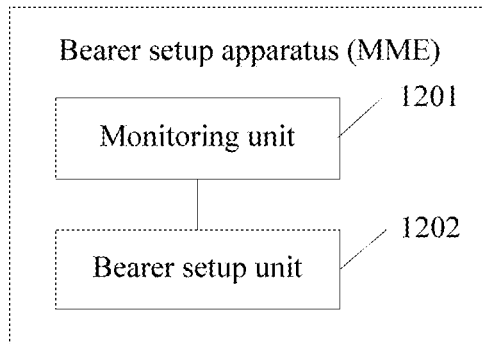
FIG. 12 is a schematic diagram of another bearer setup apparatus according to an embodiment of the present invention.

As shown in FIG. 12, an embodiment of the present invention provides a bearer setup apparatus. The apparatus is an MME, and the apparatus may specifically be configured to perform the steps of the MME in the embodiment shown in FIG. 2, FIG. 9 or FIG. 10. The apparatus includes a monitoring unit 1201 and a bearer setup unit 1202 as follows.

The monitoring unit 1201 is configured to monitor a data transmission state of UE, where the data transmission state of the UE includes at least one of a data volume of the UE or a data packet sending frequency of the UE.

The bearer setup unit 1202 is configured to: when the data transmission state of the UE satisfies a first preset condition, set up a user plane bearer for the UE; or when the data transmission state of the UE satisfies a second preset condition, set up a control plane bearer for the UE.

If the data transmission state of the UE includes the data volume of the UE, the first preset condition may be that the data volume of the UE is greater than a preset data volume threshold; or if the data transmission state of the UE includes the data packet sending frequency of the UE, the first preset condition may be that the data packet sending frequency of the UE is greater than a preset frequency threshold; or if the data transmission state of the UE includes the data volume of the UE and the data packet sending frequency of the UE, the first preset condition may be that the data packet sending frequency of the UE is greater than a preset frequency threshold, or the data volume of the UE is greater than a preset data volume threshold.

If the data transmission state includes the data volume of the UE, the second preset condition may be that the data volume of the UE is less than a preset data volume threshold; or if the data transmission state includes the data packet sending frequency of the UE, the second preset condition may be that the data packet sending frequency of the UE is less than a preset frequency threshold; or if the data transmission state of the UE includes the data volume of the UE and the data packet sending frequency of the UE, the second preset condition may be that the data packet sending frequency of the UE is less than a preset frequency threshold, and the data volume of the UE is less than a preset data volume threshold.

For the first preset condition and the second preset condition, refer to related description of the embodiment shown in FIG. 2, and details are not described.

Optionally, the bearer setup unit 1202 is specifically configured to:

send an address of a base station of the UE and a TEID of the base station to an SGW of the UE; and send an address of the SGW and a TEID of the SGW to the base station.

Optionally, the apparatus further includes a first releasing unit 1203, configured to release the user plane bearer between the MME and the SGW of the UE.

Optionally, the apparatus further includes a first sending unit 1204.

The first sending unit 1204 is configured to send transmission manner indication information to a PGW, where the transmission manner indication information is used to indicate that a data transmission manner of the UE is a user plane transmission manner.

Optionally, the bearer setup unit 1202 is specifically configured to:

set up the user plane bearer between the MME and the SGW of the UE.

Optionally, the bearer setup unit 1202 is specifically further configured to: send an address of the MME and a TEID of the MME to the SGW; and receive an address of the SGW and a TEID of the SGW.

Optionally, the bearer setup unit 1202 is specifically further configured to:

instruct the UE to transmit data in a control plane transmission manner.

Optionally, the apparatus further includes a second releasing unit 1205.

The second releasing unit 1205 is configured to trigger releasing of a DRB and an S1 user plane bearer.

It should be noted that for the DRB, the S1 user plane bearer, the control plane transmission manner, and the like, refer to each method embodiment described above, and details are not described.

The bearer setup apparatus provided in this embodiment of the present invention monitors a data transmission state of UE and sets up a user plane bearer or a control plane bearer for the UE according to the data transmission state of the UE, that is, adjusts a bearer type in real time according to the data transmission state of the UE, so as to adapt to fluctuation of data volume of the UE, and lower loss of a network and the user equipment while improving user experience.

Figure 13:
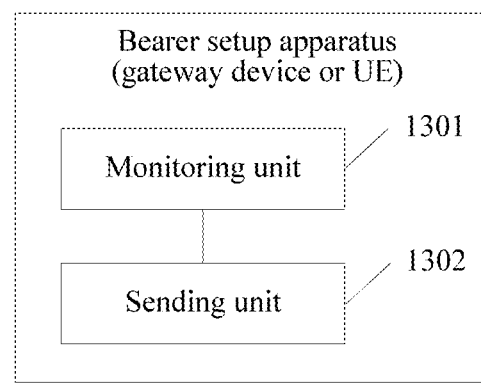
FIG. 13 is a schematic diagram of another bearer setup apparatus according to an embodiment of the present invention.

As shown in FIG. 13, an embodiment of the present invention provides a bearer setup apparatus. The apparatus may be a gateway device such as an SGW or a PGW, or may be UE, and may specifically be configured to perform the steps of the gateway device or the UE in the embodiment shown in any one of FIG. 3 or FIG. 4 to FIG. 8. The apparatus includes a monitoring unit 1301 and a sending unit 1302 as follows.

The monitoring unit 1301 is configured to monitor a status of to-be-sent data of UE.

The sending unit 1302 is configured to send indication information to a mobility management entity MME according to the status of the to-be-sent data, where the indication information is used to indicate a bearer type that is set up for the UE.

If the to-be-sent data is big data, the bearer type may be a user plane bearer; or if the to-be-sent data is infrequent small data, the bearer type may be a control plane bearer.

For the to-be-sent data of the UE, the bearer type, the control plane bearer, the user plane bearer, and the indication information, refer to related description of each method embodiment described above, and details are not described.

Optionally, the monitoring unit 1301 is specifically configured to:

if a length of the to-be-sent data is greater than a preset length threshold, the to-be-sent data is big data; or if a length of the to-be-sent data is less than a preset length threshold, and a sending or receiving frequency of the to-be-sent data is less than a preset frequency threshold, the to-be-sent data is infrequent small data.

The apparatus is a gateway device, and the to-be-sent data of the UE is data to be sent by the gateway device to the UE; or the apparatus is the UE, and the to-be-sent data of the UE is data to be sent by the UE to a network.

The bearer setup apparatus provided in this embodiment of the present invention monitors a status of to-be-sent data of UE and sends indication information used to indicate a bearer type, to an MME according to the status of the to-be-sent data of the UE, so that the MME sets up different types of bearers in real time according to the indication information, so as to adapt to transmission of sharply fluctuated data services.

Figure 14:
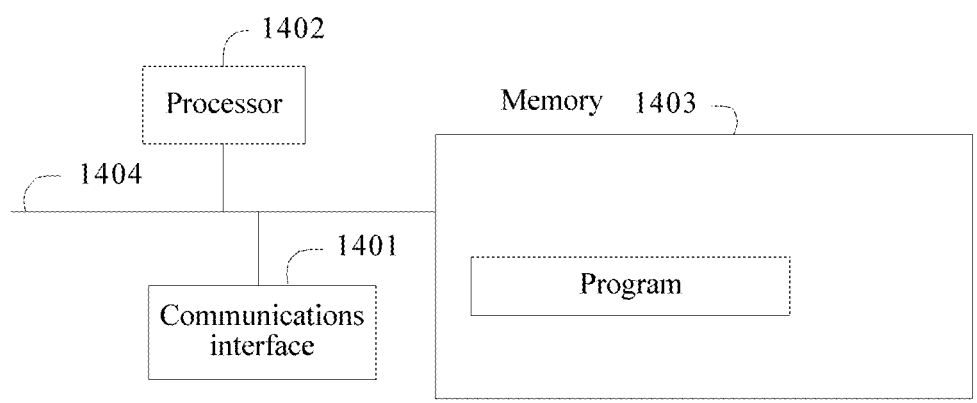
FIG. 14 is a schematic diagram of another bearer setup apparatus according to an embodiment of the present invention.

As shown in FIG. 14, an embodiment of the present invention provides a bearer setup apparatus. The apparatus is an MME and the apparatus includes a communications interface 1401, a processor 1402, a memory 1403, and a bus 1404. The bus 1404 is configured to connect the processor 1402, the memory 1403, and the communications interface 1401. The processor 1402 is configured to execute a program stored in the memory 1403. The program may specifically include the steps of the MME in the embodiment shown in any one of FIG. 1b or FIG. 4 to FIG. 8.

The communications interface 1401 is configured to receive indication information, where the indication information is used to indicate a bearer type that is set up for UE.

The processor 1402 is configured to set up a bearer for the UE according to the indication information received by the communications interface 1401.

For the indication information, the bearer, the bearer type and the setup of the bearer for the UE, refer to related description in the embodiment shown in FIG. 1b, and details are not described.

Optionally, the communications interface 1401 is specifically configured to:

receive the indication information sent by the UE; or
receive the indication information sent by a gateway device.

The gateway device may specifically be a PGW or an SGW. This is not limited.

The indication information may be carried in a NAS message. Specifically, when the gateway device is a serving gateway SGW of the UE, the indication information may be carried in a GTP message.

Optionally, the processor 1402 is specifically configured to:

if the bearer type is a user plane bearer, set up a user plane bearer for the UE; or if the bearer type is a control plane bearer, set up a control plane bearer for the UE.

For the user plane bearer and the control plane bearer, refer to related description of each method embodiment described above, and details are not described.

Optionally, the processor 1402 is specifically further configured to:

send an address of a base station of the UE and a TEID of the base station to the SGW of the UE; and send an address of the SGW and a TEID of the SGW to the base station.

For details of the base station and the SGW, refer to related description of each method embodiment described above, and details are not described.

Optionally, the processor 1402 is further configured to: if a control plane transmission manner is used to transmit data between the MME and the SGW, send a request message to the SGW, where the request message is used to request the address of the SGW and the TEID of the SGW.

The communications interface 1401 is further configured to receive the address of the SGW and the TEID of the SGW that are sent by the SGW.

Optionally, the communications interface 1401 is further configured to receive the address of the SGW and the TEID of the SGW that are sent by the SGW.

Optionally, the processor 1402 is specifically configured to:

set up the user plane bearer between the MME and the SGW of the UE.

Optionally, the processor 1402 is specifically further configured to:

send an address of the MME and a TEID of the MME to the SGW; and receive an address of the SGW and a TEID of the SGW.

Optionally, the processor 1402 is specifically further configured to:

send a paging message to the UE; and receive a NAS response message sent by the UE and set up a signaling radio bearer SRB.

Optionally, the processor 1402 is further configured to:

instruct the UE to transmit data in a control plane transmission manner.

Optionally, the communications interface 1401 is further configured to send transmission manner indication information to a packet data network gateway PGW, where the transmission manner indication information is used to indicate that a data transmission manner of the UE is the control plane transmission manner or a user plane transmission manner.

The bearer setup apparatus provided in this embodiment of the present invention receives indication information used to indicate a bearer type that is set up for UE, and sets up different types of bearers for the UE according to the indication information, so that the apparatus can adjust the bearer type in real time as required and set up different types of bearers for the UE, thereby efficiently transmitting sharply fluctuated data, and lowering loss of a network and the user equipment while improving user experience.

Figure 15:
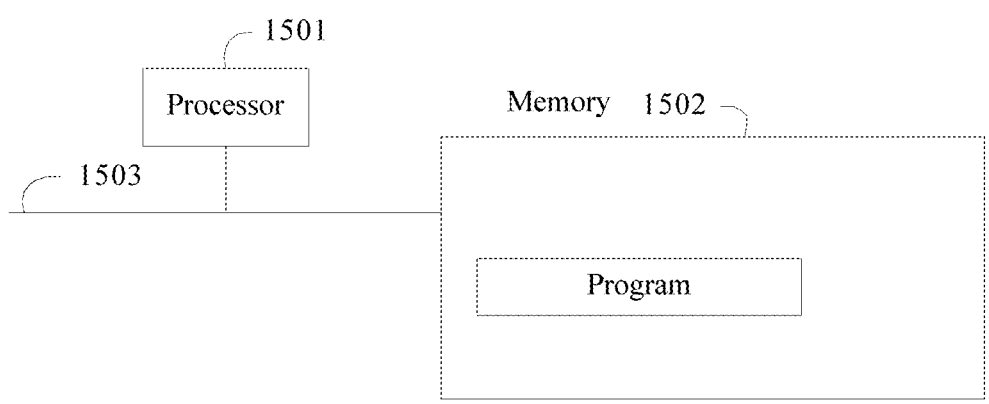
FIG. 15 is a schematic diagram of another bearer setup apparatus according to an embodiment of the present invention.

As shown in FIG. 15, an embodiment of the present invention provides a bearer setup apparatus. The apparatus is an MME and may include a processor 1501, a memory 1502, and a bus 1503. The bus 1503 is configured to connect the processor 1501 and the memory 1502. The processor 1501 is configured to execute a program stored in the memory 1502. The program may specifically include the steps of the MME in the embodiment shown in FIG. 2, FIG. 9 or FIG. 10.

The processor 1501 is configured to monitor a data transmission state of UE, where the data transmission state of the UE includes at least one of a data volume of the UE or a data packet sending frequency of the UE.

The processor 1501 is configured to: when the data transmission state of the UE satisfies a first preset condition, set up a user plane bearer for the UE; or when the data transmission state of the UE satisfies a second preset condition, set up a control plane bearer for the UE.

If the data transmission state of the UE includes the data volume of the UE, the first preset condition may be that the data volume of the UE is greater than a preset data volume threshold; or if the data transmission state of the UE includes the data packet sending frequency of the UE, the first preset condition may be that the data packet sending frequency of the UE is greater than a preset frequency threshold; or if the data transmission state of the UE includes the data volume of the UE and the data packet sending frequency of the UE, the first preset condition may be that the data packet sending frequency of the UE is greater than a preset frequency threshold, or the data volume of the UE is greater than a preset data volume threshold.

If the data transmission state includes the data volume of the UE, the second preset condition may be that the data volume of the UE is less than a preset data volume threshold; or if the data transmission state includes the data packet sending frequency of the UE, the second preset condition may be that the data packet sending frequency of the UE is less than a preset frequency threshold; or if the data transmission state of the UE includes the data volume of the UE and the data packet sending frequency of the UE, the second preset condition may be that the data packet sending frequency of the UE is less than a preset frequency threshold, and the data volume of the UE is less than a preset data volume threshold.

For the first preset condition and the second preset condition, refer to related description of the embodiment shown in FIG. 2, and details are not described.

Optionally, the processor 1501 is specifically configured to:

send an address of a base station of the UE and a TEID of the base station to an SGW of the UE; and send an address of the SGW and a TEID of the SGW to the base station.

Optionally, the processor 1501 is further configured to release the user plane bearer between the MME and the SGW of the UE.

Optionally, the apparatus further includes a communications interface 1504.

The communications interface 1504 is configured to send transmission manner indication information to a PGW, where the transmission manner indication information is used to indicate that a data transmission manner of the UE is a user plane transmission manner.

Optionally, the processor 1501 is specifically configured to:

set up the user plane bearer between the MME and the SGW of the UE.

Optionally, the communications interface 1504 is further configured to:

send an address of the MME and a TEID of the MME to the SGW; and receive an address of the SGW and a TEID of the SGW.

Optionally, the processor 1501 is specifically further configured to:

instruct the UE to transmit data in a control plane transmission manner.

Optionally, the processor 1501 is further configured to trigger releasing of a DRB and an S1 user plane bearer.

It should be noted that for the DRB, the S1 user plane bearer, the control plane transmission manner, and the like, refer to each method embodiment described above, and details are not described.

The bearer setup apparatus provided in this embodiment of the present invention monitors a data transmission state of UE and sets up a user plane bearer or a control plane bearer for the UE according to the data transmission state of the UE, that is, adjusts a bearer type in real time according to the data transmission state of the UE, so as to adapt to fluctuation of data volume of the UE, and lower loss of a network and the user equipment while improving user experience.

Figure 16:
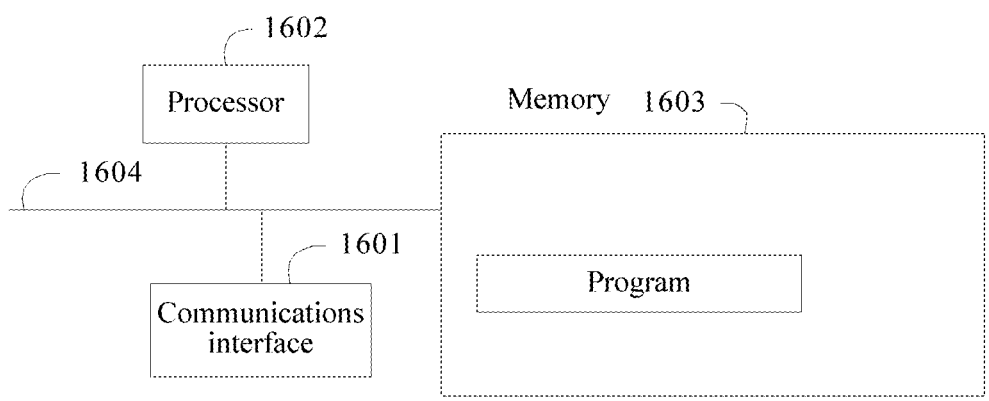
FIG. 16 is a schematic diagram of still another bearer setup apparatus according to an embodiment of the present invention.

As shown in FIG. 16, an embodiment of the present invention provides a bearer setup apparatus. The apparatus may be a gateway device such as, an SGW or a PGW, or may be UE. The apparatus includes a communications interface 1601, a processor 1602, a memory 1603, and a bus 1604. The bus 1604 is configured to connect the processor 1602, the memory 1603, and the communications interface 1601. The processor 1602 is configured to execute a program stored in the memory 1603. The program may specifically include the steps of the gateway device or the UE of the embodiment shown in any one of FIG. 3 or FIG. 4 to FIG. 8.

The processor 1602 is configured to monitor a status of to-be-sent data of UE.

The processor 1602 is further configured to send indication information to an MME according to the status of to-be-sent data by using the communications interface 1601, where the indication information is used to indicate a bearer type that is set up for the UE.

If the to-be-sent data is big data, the bearer type may be a user plane bearer; or if the to-be-sent data is infrequent small data, the bearer type may be a control plane bearer.

For the to-be-sent data of the UE, the bearer type, the control plane bearer, the user plane bearer, and the indication information, refer to related description of each method embodiment described above, and details are not described.

Optionally, the processor 1602 is specifically configured to:

if a length of the to-be-sent data is greater than a preset length threshold, the to-be-sent data is big data; or if a length of the to-be-sent data is less than a preset length threshold, and a sending or receiving frequency of the to-be-sent data is less than a preset frequency threshold, the to-be-sent data is infrequent small data.

The apparatus is a gateway device, and the to-be-sent data of the UE is data to be sent by the gateway device to the UE; or the apparatus is the UE, and the to-be-sent data of the UE is data to be sent by the UE to a network.

The bearer setup apparatus provided in this embodiment of the present invention monitors a status of to-be-sent data of UE and sends indication information used to indicate a bearer type, to an MME according to the status of the to-be-sent data of the UE, so that the MME sets up different types of bearers in real time according to the indication information, so as to adapt to transmission of sharply fluctuated data services.

It should be noted that an embodiment of the present invention further provides a bearer setup system. The system may include the MME shown in FIG. 11 and the gateway device or the UE shown in FIG. 13; or the MME shown in FIG. 14 and the gateway device or the UE shown in FIG. 16, and details are not described.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code such as a ROM, a RAM, a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A bearer setup method, comprising:
receiving, by a mobility management entity from a user equipment (UE), indication information that indicates a bearer type set up for the UE, the UE being in a connected state and transmitting data using a control plane bearer;
setting up, by the mobility management entity, a user plane bearer for the UE in response to the bearer type being a user plane bearer type; and
releasing, by the mobility management entity, an S11 user plane bearer between the mobility management entity and a serving gateway for the UE.

2. The method according to claim 1, wherein the indication information is carried in a non-access stratum (NAS) message.

3. The method according to claim 1, wherein the setting up, by the mobility management entity, the user plane bearer for the UE comprises:
sending, by the mobility management entity, an address of a base station of the UE and a tunnel endpoint identifier (TEID) of the base station to the serving gateway; and
sending, by the mobility management entity, an address of the serving gateway and a TEID of the serving gateway to the base station.

4. The method according to claim 1, wherein after the setting up, by the mobility management entity, the user plane bearer for the UE, the method further comprises:
sending, by the mobility management entity, transmission manner indication information to a packet data network gateway, wherein the transmission manner indication information indicates that a data transmission manner of the UE is a user plane transmission manner.

5. A bearer setup apparatus, wherein the apparatus is a mobility management entity and the apparatus comprises:
a memory storing instructions;
a communications interface configured to receive indication information from a user equipment (UE), the indication information indicating a bearer type that is set up for the UE, the UE being in a connected state and transmitting data using a control plane bearer; and
a processor in communication with the memory and with the communications interface, the processor executing the instructions to;
set up a user plane bearer for the UE in response to the bearer type being a user plane bearer type, and
release an S11 user plane bearer between the mobility management entity and a serving gateway of the UE.

6. The apparatus according the claim 5, wherein the indication information is carried in a non-access stratum (NAS) message.

7. The apparatus according to claim 5, wherein the processor is further configured to:
send an address of a base station of the UE and a tunnel endpoint identifier (TEID) of the base station to the serving gateway; and
send an address of the serving gateway and a TEID of the serving gateway to the base station.

8. The apparatus according to claim 5, wherein the communications interface is further configured to:
send transmission manner indication information to a packet data network gateway, wherein the transmission manner indication information indicates that a data transmission manner of the UE is a user plane transmission manner.

9. A non-transitory computer readable medium storing computer instructions that when executed by one or more processors, cause the one or more processors to perform the steps of:
receiving indication information from a user equipment (UE) that indicates a bearer type set up for the UE, the UE being in a connected state and transmitting data using a control plane bearer;
setting up a user plane bearer for the UE in response to the bearer type being a user plane bearer type; and
releasing an S11 user plane bearer between the mobility management entity and a serving gateway of the UE.

10. The non-transitory computer readable medium according to claim 9, wherein the indication information is carried in a non-access stratum (NAS) message.

11. The non-transitory computer readable medium according to claim 9, wherein the computer instructions further cause the one or more processors to perform the steps of:
sending an address of a base station of the UE and a tunnel endpoint identifier (TEID) of the base station to the serving gateway; and
sending an address of the SGW serving gateway and a TEID of the serving gateway to the base station.

12. The non-transitory computer readable medium according to claim 9, wherein the computer instructions further cause the one or more processors to perform the steps of:
sending transmission manner indication information to a packet data network gateway, wherein the transmission manner indication information indicates that a data transmission manner of the UE is a user plan transmission manner.

\* \* \* \* \*